United States Patent
Geyer

(10) Patent No.: US 10,307,954 B2
(45) Date of Patent: Jun. 4, 2019

(54) CAPPED CARBON FILTER ASSEMBLY

(71) Applicant: Fred Geyer, Rensselaer, IN (US)

(72) Inventor: Fred Geyer, Rensselaer, IN (US)

( * ) Notice: Subject to any disclaimer, the term of this patent is extended or adjusted under 35 U.S.C. 154(b) by 15 days.

(21) Appl. No.: 14/982,143

(22) Filed: Dec. 29, 2015

(65) Prior Publication Data
US 2017/0182452 A1 Jun. 29, 2017

(51) Int. Cl.
| | |
|---|---|
| *B01D 53/04* | (2006.01) |
| *B29C 48/00* | (2019.01) |
| *B01J 20/28* | (2006.01) |
| *B01D 39/00* | (2006.01) |
| *B01J 20/20* | (2006.01) |
| *B01J 20/30* | (2006.01) |
| B29K 103/04 | (2006.01) |
| B29K 105/00 | (2006.01) |
| B29L 31/14 | (2006.01) |
| *B29C 48/09* | (2019.01) |
| B29K 105/10 | (2006.01) |
| B01D 53/14 | (2006.01) |

(52) U.S. Cl.
CPC .......... *B29C 48/0022* (2019.02); *B01D 39/00* (2013.01); *B01J 20/20* (2013.01); *B01J 20/28014* (2013.01); *B01J 20/3007* (2013.01); *B01J 20/3042* (2013.01); B01D 53/1425 (2013.01); B01D 53/1462 (2013.01); B01D 2252/204 (2013.01); B01D 2252/2023 (2013.01); B29C 48/001 (2019.02); B29C 48/09 (2019.02); B29K 2103/04 (2013.01); B29K 2105/10 (2013.01); B29K 2105/102 (2013.01); B29K 2105/103 (2013.01); B29K 2105/251 (2013.01); B29L 2031/14 (2013.01)

(58) Field of Classification Search
CPC ............ B01D 53/0407; B01D 53/1468; B01D 53/1475; B01D 53/1493; B29C 37/0025; B29C 47/0023; B29C 47/0066; B29L 2031/14; C10L 3/103; C10L 3/104; C10L 2290/541; C10L 2290/547
USPC .......... 96/108, 134; 210/660, 338, 342, 489, 210/490
See application file for complete search history.

(56) References Cited

U.S. PATENT DOCUMENTS

| | | | | |
|---|---|---|---|---|
| 3,375,933 A | * | 4/1968 | Rodman | B01J 20/28004 210/502.1 |
| 4,000,236 A | * | 12/1976 | Redfarn | C01B 32/384 264/112 |
| 4,139,354 A | * | 2/1979 | Giles | B01D 53/0431 55/510 |
| 4,714,597 A | * | 12/1987 | Trevino | B01D 53/1493 252/189 |
| 5,017,286 A | * | 5/1991 | Heiligman | B01D 35/043 210/266 |
| 5,082,568 A | * | 1/1992 | Holler | B01J 47/024 210/679 |
| 5,106,501 A | * | 4/1992 | Yang | B01D 24/04 210/266 |
| 5,164,085 A | * | 11/1992 | Spokoiny | C02F 1/003 210/256 |

(Continued)

*Primary Examiner* — Frank M Lawrence, Jr.
(74) *Attorney, Agent, or Firm* — Ice Miller LLP

(57) ABSTRACT

A carbon filter is disclosed. Such a carbon filter includes a carbon-based core having a central cavity, a layer of a polymer-based filter material surrounding the carbon-based core, and at least one end cap fixedly attached to the carbon-based core.

18 Claims, 14 Drawing Sheets

(56) References Cited

U.S. PATENT DOCUMENTS

| | | | | |
|---|---|---|---|---|
| 5,762,797 A | * | 6/1998 | Patrick | A61L 2/16 |
| | | | | 210/488 |
| 2003/0205518 A1 | * | 11/2003 | VanderKooi | B01D 29/111 |
| | | | | 210/315 |
| 2004/0206682 A1 | * | 10/2004 | Hamlin | B01D 19/0031 |
| | | | | 210/321.6 |
| 2005/0121387 A1 | * | 6/2005 | Kuennen | C02F 1/505 |
| | | | | 210/503 |
| 2010/0219131 A1 | * | 9/2010 | Levy | B01D 39/2058 |
| | | | | 210/663 |
| 2011/0089103 A1 | * | 4/2011 | Bommi | B01D 36/001 |
| | | | | 210/472 |
| 2014/0263054 A1 | * | 9/2014 | Julos | C02F 1/001 |
| | | | | 210/636 |
| 2015/0068967 A1 | * | 3/2015 | Nock | C02F 1/283 |
| | | | | 210/287 |
| 2015/0343341 A1 | * | 12/2015 | Carrion | B01D 29/58 |
| | | | | 210/767 |
| 2016/0121249 A1 | * | 5/2016 | Koslow | B01D 39/2062 |
| | | | | 210/502.1 |

\* cited by examiner

CAPPED CARBON FILTER ASSEMBLY

BACKGROUND

The process of producing natural gas for consumer and commercial consumption involves, among other steps, treating such natural gas to remove certain impurities such as hydrogen sulfide and carbon dioxide. The natural gas purification process, sometimes called "sweetening," includes exposing the impure natural gas to amine or glycol solvents, which have an affinity for hydrogen sulfide and carbon dioxide and therefore remove these undesirable compounds from the natural gas. Thereafter, the amine or glycol solvents are exposed to activated carbon in order to remove the hydrogen sulfide and carbon dioxide and permit the solvent to be re-used in the natural gas purification process. The activated carbon used in amine and glycol filtration typically is provided in a heavy steel filter canister. During use, the activated carbon become saturated, adding to the weight of the filter canister. By the time the filter canister is due for replacement, the filter has become so heavy that it is difficult and dangerous to handle. Further, a steel filter canister cannot be disposed of through incineration. It must be disposed of in a landfill.

It is desired to provide an improved activated carbon filter for use in amine reclamation and in glycol reclamation.

SUMMARY

The present disclosure includes disclosure of an improved carbon filter. In at least one embodiment, a carbon filter according to the present disclosure comprises a carbon-based core having a central cavity; a layer of a polymer-based filter material surrounding the carbon-based core; and at least one end cap fixedly attached to the carbon-based core. In at least one embodiment, a carbon filter according to the present disclosure comprises a carbon-based core having a cylindrical shape, a top end, a bottom end, an external wall, and an internal wall, the external wall and the internal wall being substantially concentric, the internal wall defining the central cavity, the central cavity extending from the top end to the bottom end of the carbon-based core. In at least one embodiment, a carbon filter according to the present disclosure comprises a carbon-based core comprising a mixture of carbon and a binding material. In an aspect of such an embodiment, the binding material comprises a polymer. In an aspect of such an embodiment, the polymer is selected from the group consisting of polyester, polypropylene, and nylon. In at least one embodiment, a carbon filter according to the present disclosure comprises at least one end cap comprising an opening therethrough. In at least one embodiment, a carbon filter according to the present disclosure comprises a carbon-based core having a cylindrical shape, a top end, a bottom end, an external wall, and an internal wall, the external wall and the internal wall being substantially concentric, the internal wall defining the central cavity, the central cavity extending from the top end to the bottom end of the carbon-based core, and wherein at least one end cap is affixed to the top end of the carbon-based core. In an aspect of such an embodiment, an opening in the at least one end cap aligns with the central cavity. In at least one embodiment, a carbon filter according to the present disclosure comprises a carbon-based core having a cylindrical shape, a top end, a bottom end, an external wall, and an internal wall, the external wall and the internal wall being substantially concentric, the internal wall defining the central cavity, the central cavity extending from the top end to the bottom end of the carbon-based core, and wherein a first end cap is affixed to the top end of the carbon-based core and a second end cap is affixed to the bottom end of the carbon-based core. In an aspect of such an embodiment, the first end cap comprises a first end cap opening therethrough, and the first end cap opening aligns with the central cavity. In an aspect of such an embodiment, the second end cap comprises a second end cap opening therethrough, and the second end cap opening aligns with the central cavity. In at least one embodiment, a carbon filter according to the present disclosure comprises a polymer-based filter material comprising a polymer selected from the group consisting of polyester, polypropylene, and nylon.

The present disclosure includes disclosure of a method of making an improved carbon filter assembly. In at least one embodiment, a method for making a carbon filter assembly comprises the steps of mixing carbon and a binder material to make a carbon/binder mixture; extruding the carbon/binder mixture to form a filter core, the filter core having a cylindrical shape, a top end, a bottom end, and an external surface; applying a layer of filter material to the exterior surface of the filter core; affixing a first end cap to the top end of the filter core; and affixing a second end cap to the bottom end of the filter core. In at least one embodiment, a method for making a carbon filter assembly comprises the steps of selecting a binder material from the group consisting of polyester, polypropylene, and nylon; mixing carbon and the binder material to make a carbon/binder mixture, wherein the carbon and the binder material are present in a ratio of about 80% carbon to about 20% binder material; and heating the carbon/binder mixture past a melting point of the binder material. In at least one embodiment, a method for making a carbon filter assembly comprises the step of cutting a filter core to a predetermined length. In at least one embodiment, a method for making a carbon filter assembly comprises the steps of heating a first end cap; aligning the first end cap with a filter core; and pressing the first end cap into the filter core. In at least one embodiment, a method for making a carbon filter assembly comprises the steps of heating a second end cap; aligning the second end cap with a filter core; and pressing the second end cap into the filter core.

The present disclosure includes disclosure of a method of purifying natural gas, the method comprising the steps of exposing natural gas to a solvent selected from the group consisting of amine solvents and glycol solvents; and filtering the solvent using a carbon filter, the carbon filter comprising a carbon-based core having a central cavity; a layer of a polymer-based filter material surrounding the carbon-based core; and at least one end cap fixedly attached to the carbon-based core.

BRIEF DESCRIPTION OF THE DRAWINGS

The features and advantages of this disclosure, and the manner of attaining them, will be more apparent and better understood by reference to the following descriptions of the disclosed embodiments, taken in conjunction with the accompanying drawings, wherein.

DESCRIPTION

Figure 1:
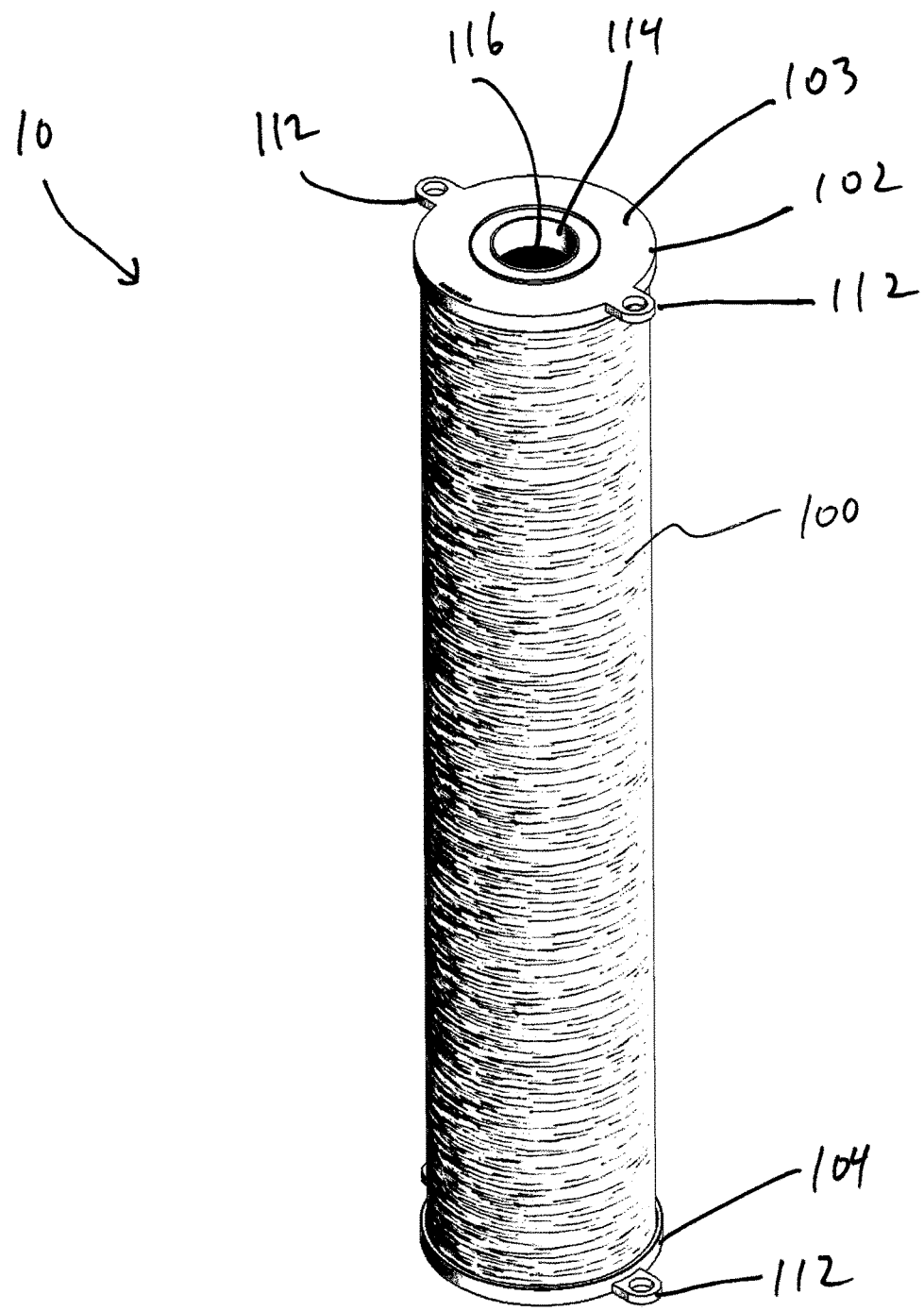
FIG. 1 shows a capped carbon filter assembly according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIGS. 1-13 show a capped carbon filter assembly according to at least one embodiment of the present disclosure. Shown in FIGS. 1-13 is capped carbon filter assembly 10 comprising filter component 100. Filter component 100 comprises a substantially cylindrical shape. First end cap 102 is affixed to first end 107 of filter component 100, and second end cap 104 is affixed to second end 109 of filter component 100.

Figure 2:
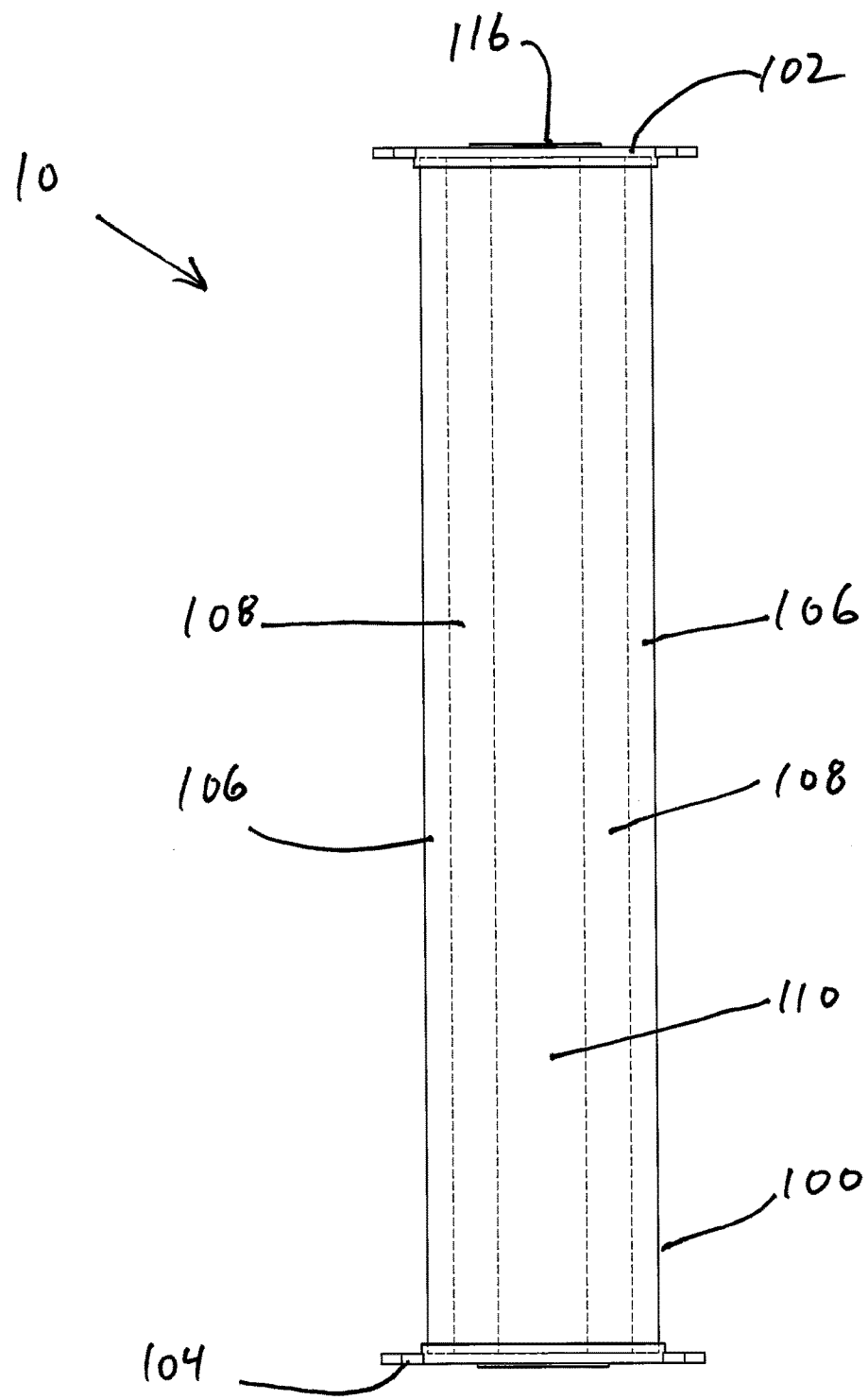
FIG. 2 shows a cross-sectional side view of a capped carbon filter assembly according to at least one embodiment of the present disclosure.

FIG. 2 shows a cross-sectional side view of capped carbon filter assembly 10. As shown in FIG. 2, filter component 100 comprises pre-filter layer 106 and carbon core 108. Carbon core 108 comprises a substantially cylindrical shape. Carbon core 108 comprises a substantially cylindrical central cavity 110, which extends the full length of carbon core 108 from first end 111 of carbon core 108 to second end 113 of carbon core 108. Pre-filter layer 106 surrounds carbon core 108. In at least one embodiment of the present disclosure, the outer diameter of central cavity 110 is 2.5 inches, the outer diameter of carbon core 108 is 4.5 inches, and the outer diameter of filter component 100 is 5 inches. However, central cavity 110, carbon core 108, and filter component 100 may be larger than or smaller than these dimensions and still be within the scope of the present disclosure.

Figure 3:
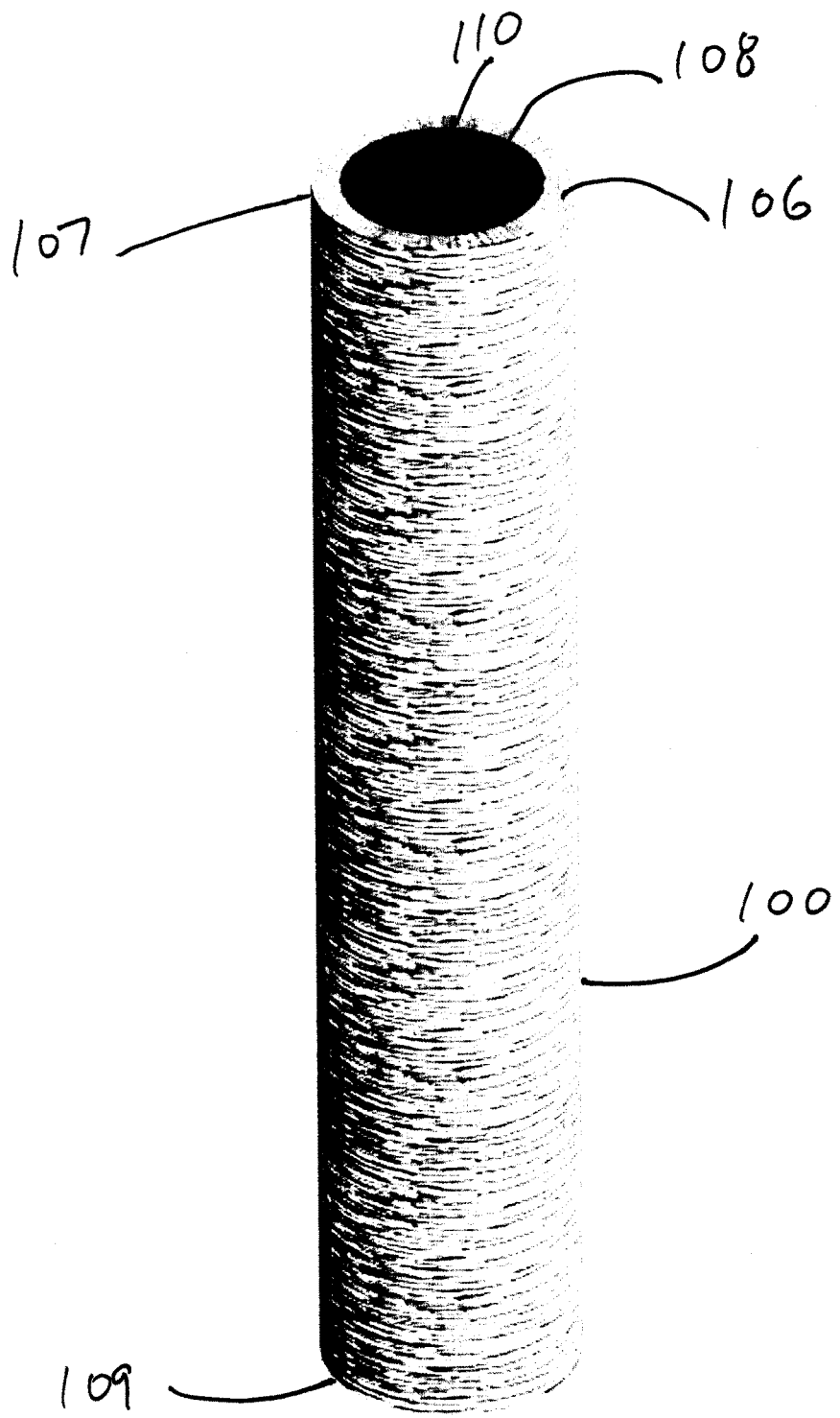
FIG. 3 shows a perspective view of a filter component of a capped carbon filter assembly according to at least one embodiment of the present disclosure.
Figure 4:
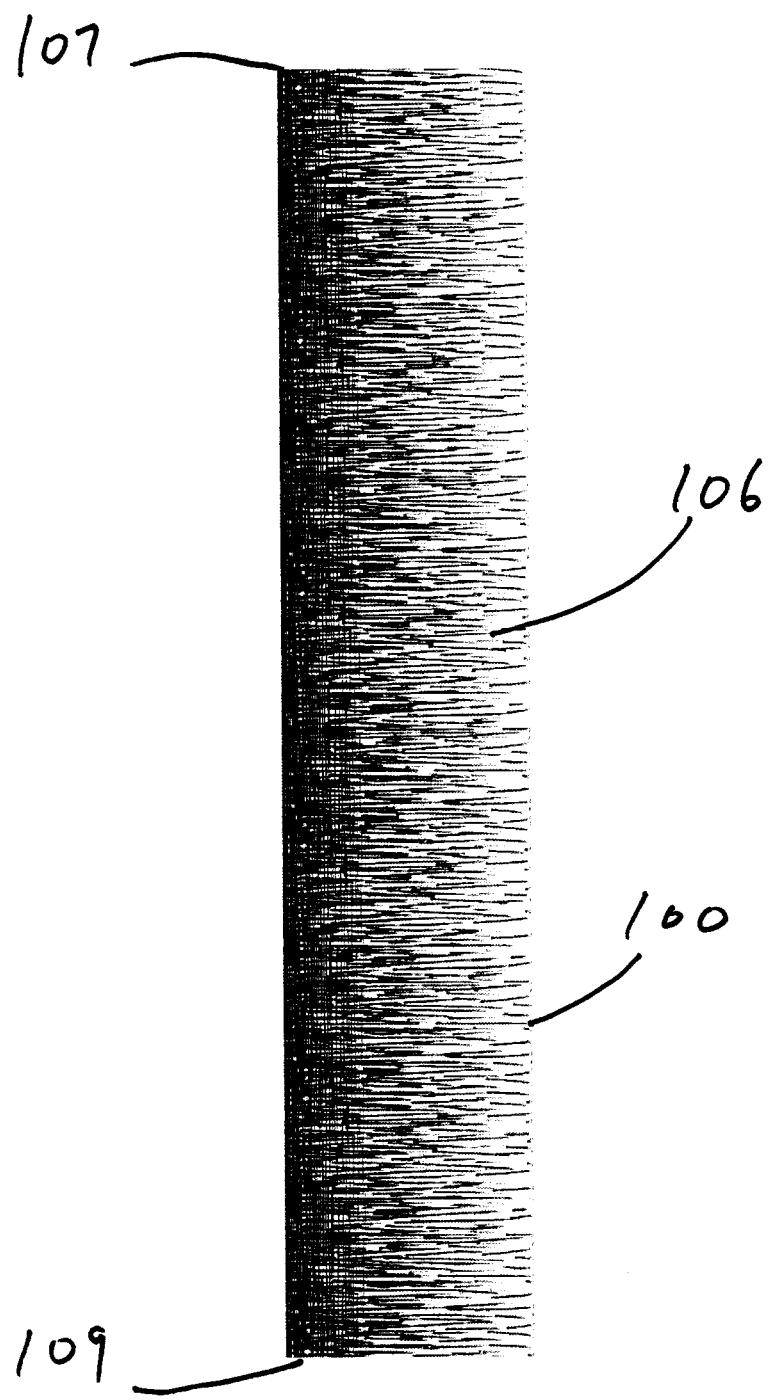
FIG. 4 shows a side elevation view of a filter component of a capped carbon filter assembly according to at least one embodiment of the present disclosure.
Figure 5:
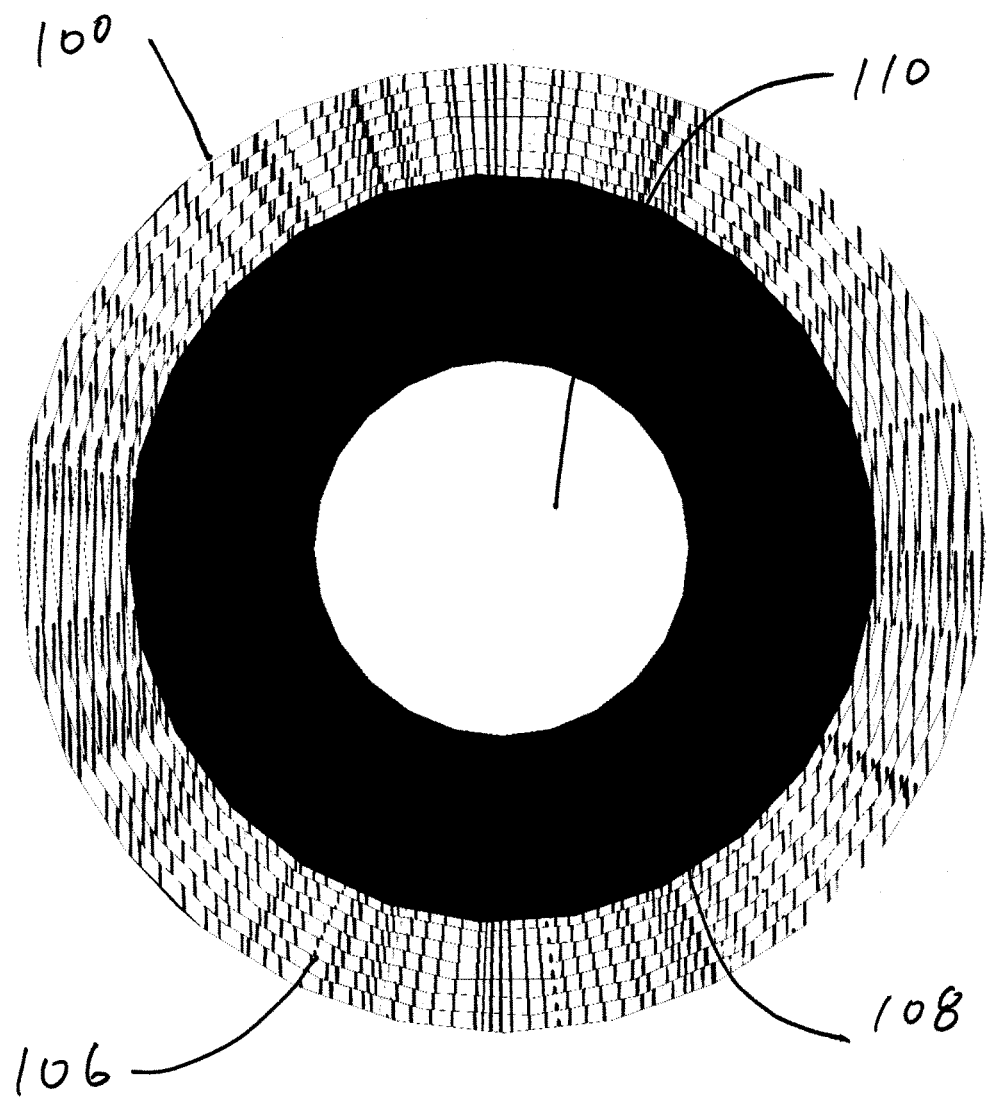
FIG. 5 shows an end view of a filter component of a capped carbon filter assembly according to at least one embodiment of the present disclosure.
Figure 6:
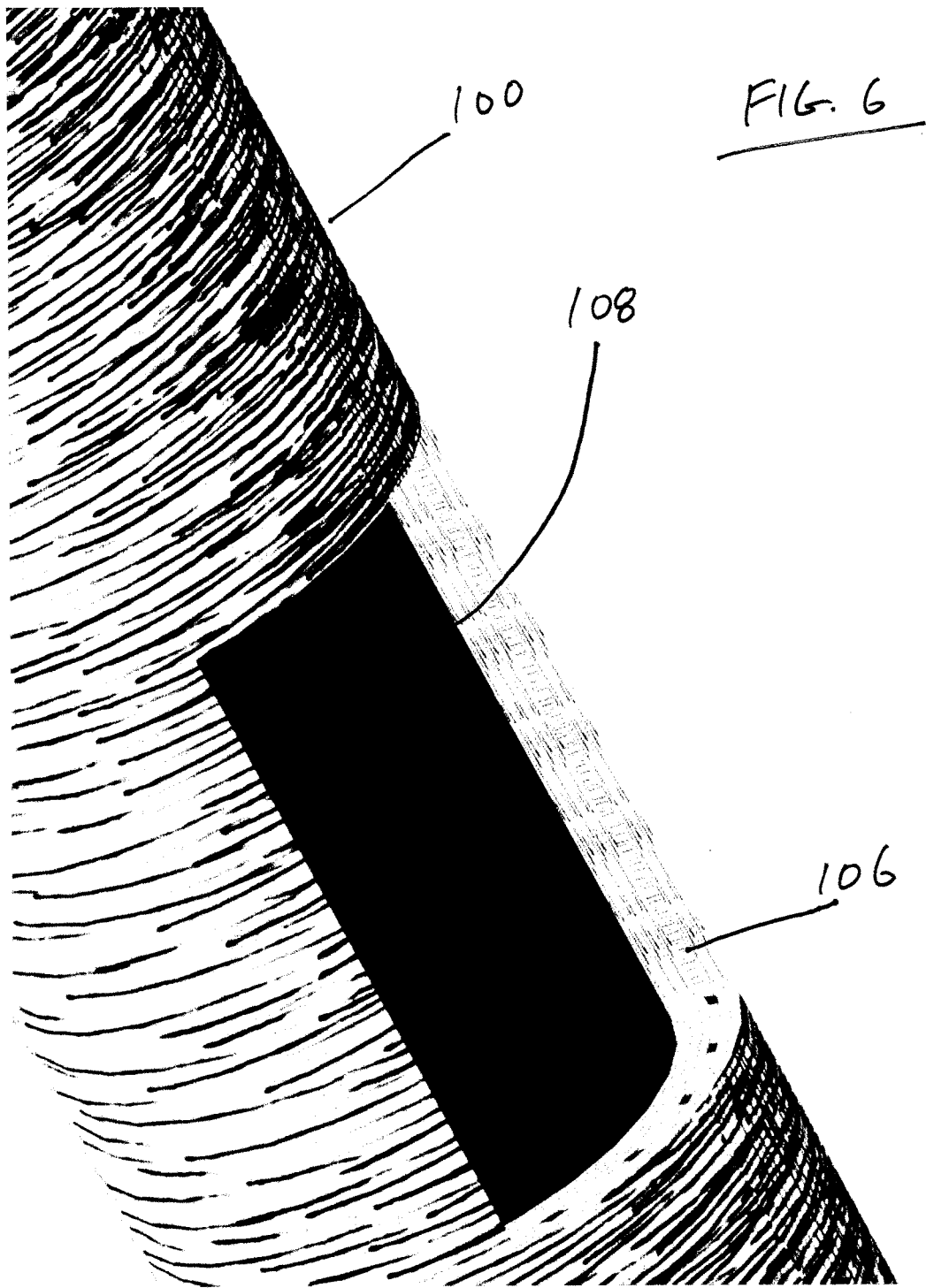
FIG. 6 shows a perspective view of a filter component of a capped carbon filter assembly according to at least one embodiment of the present disclosure, with a portion of a pre-filter layer cut away to show a carbon core within the pre-filter layer.

FIGS. 3-5, respectively, show a perspective view of filter component 100, a side elevation view of filter component 100, and an end view of filter component 100. The arrangement of pre-filter layer 106, carbon core 108, and cavity 110 are shown in FIGS. 3-5. FIG. 6 shows a perspective view of filter component 100, with a portion of pre-filter layer 106 cut away to show carbon core 108 within pre-filter layer 106.

Figure 7:
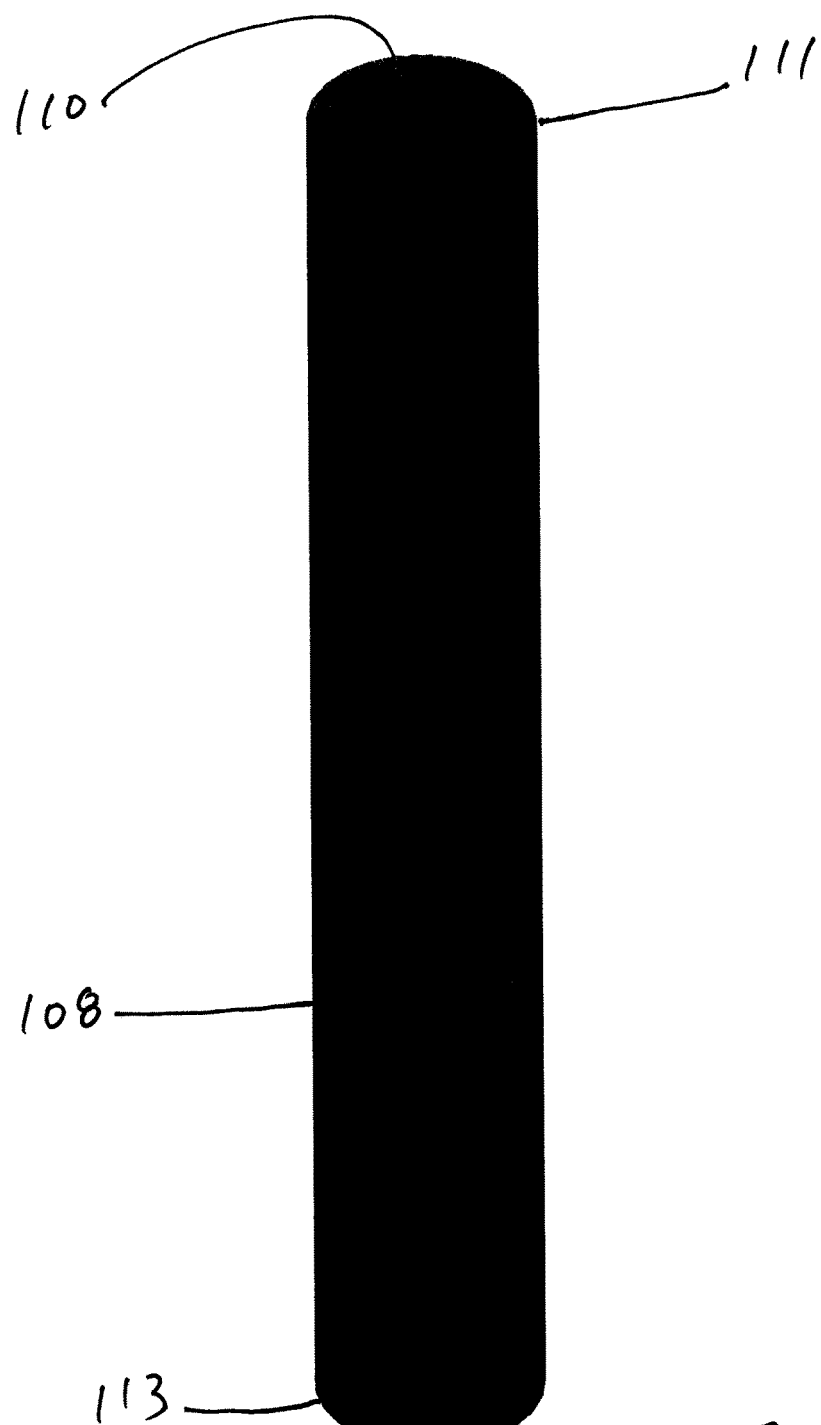
FIG. 7 shows a perspective view of a carbon core of a capped carbon filter assembly according to at least one embodiment of the present disclosure.
Figure 8:
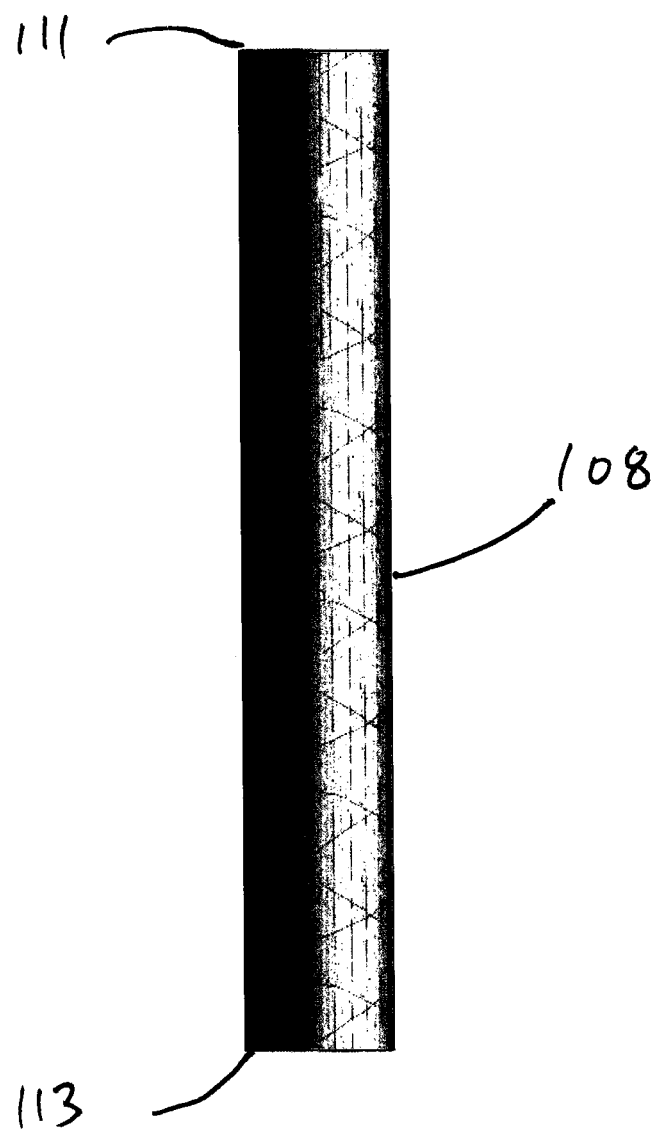
FIG. 8 shows a side elevation view of a carbon core of a capped carbon filter assembly according to at least one embodiment of the present disclosure.
Figure 9:
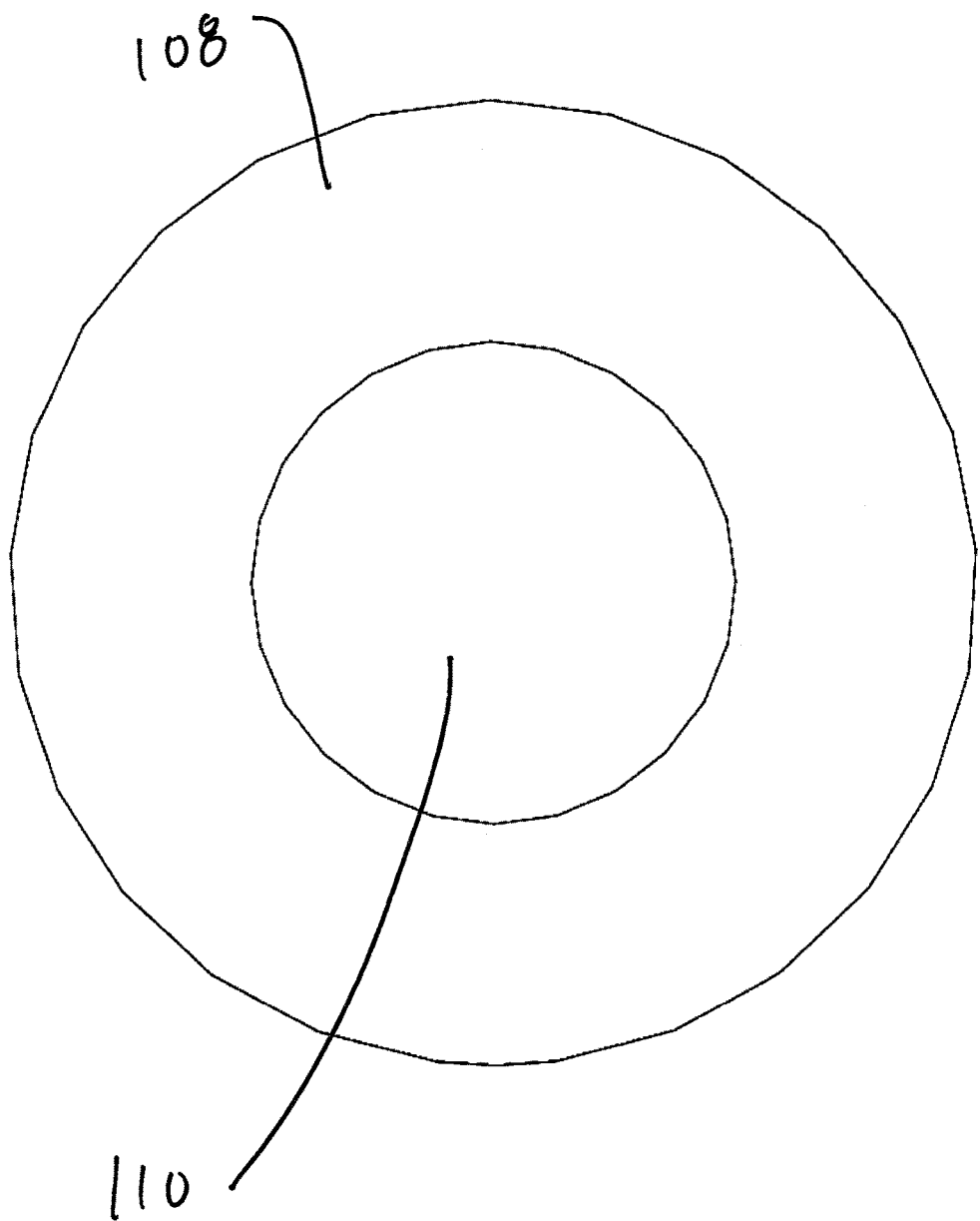
FIG. 9 shows an end view of a carbon core of a capped carbon filter assembly according to at least one embodiment of the present disclosure.

FIGS. 7-9, respectively, show a perspective view of carbon core 108, a side elevation view of carbon core 108, and an end view of carbon core 108. The arrangement of carbon core 108 and cavity 110 are shown in FIGS. 7-9.

Figure 10:
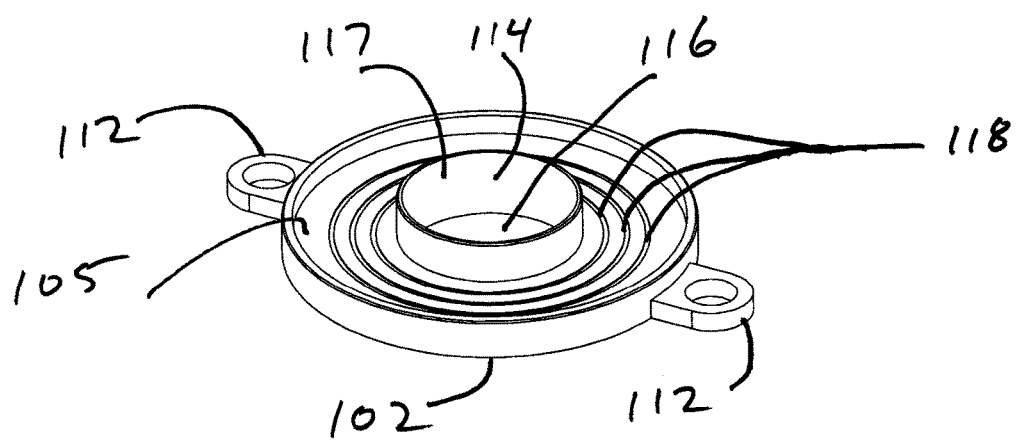
FIG. 10 shows a perspective view of the underside of an end cap of a capped carbon filter assembly according to at least one embodiment of the present disclosure.
Figure 11:
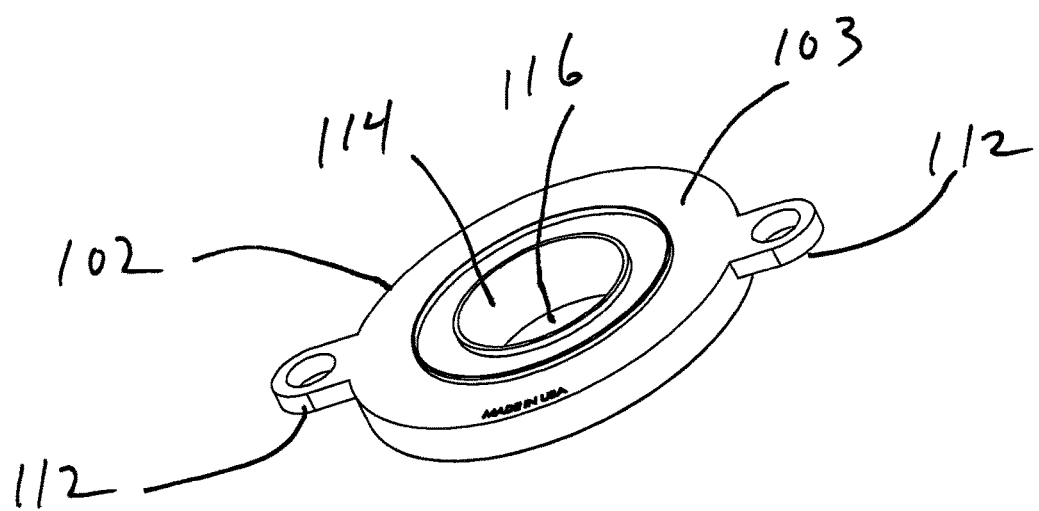
FIG. 11 shows a perspective view of an upper side of an end cap of a capped carbon filter assembly according to at least one embodiment of the present disclosure.
Figure 12:
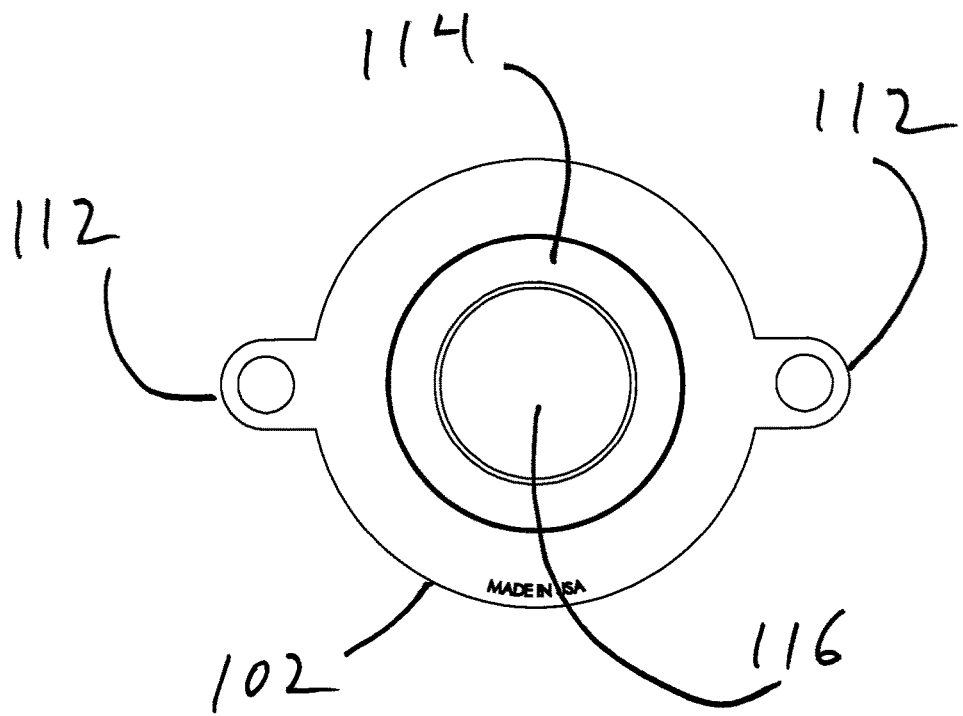
FIG. 12 shows a plan view of an upper side of an end cap of a capped carbon filter assembly according to at least one embodiment of the present disclosure.
Figure 13:
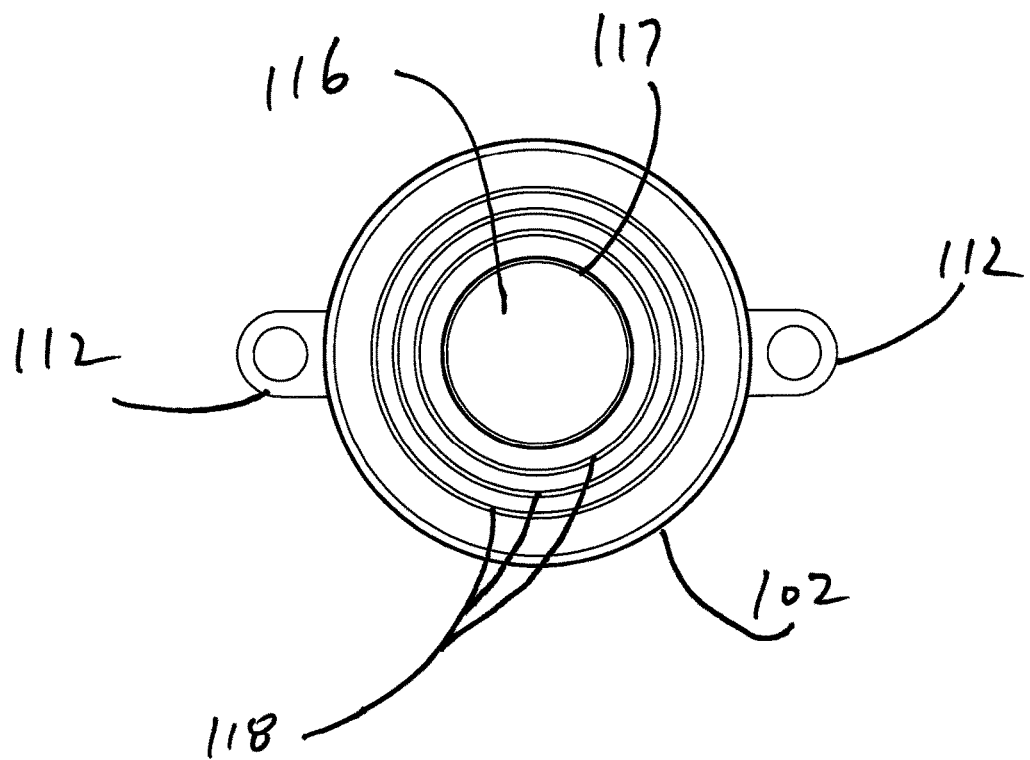
FIG. 13 shows a plan view of the underside of an end cap of a capped carbon filter assembly according to at least one embodiment of the present disclosure.

FIG. 10 shows a perspective view of underside 105 of first end cap 102. FIG. 11 shows a perspective view of upper side 103 of first end cap 102. FIG. 12 shows a plan view of upper side 103 of first end cap 102. FIG. 13 shows a plan view of underside 105 of first end cap 102. As shown in FIGS. 10-13, first end cap 102 comprises an upper side 103 and an underside 105. Gasket sealing surface 114 in first end cap 102 defines a substantially circular opening 116 that extends through first end cap 102. As shown in FIG. 10, gasket sealing surface 114 includes a lip 117 that extends below underside 105 of first end cap 102. Lip 115 is sized to fit within central cavity 110 of carbon core 108. In at least one embodiment of the present disclosure, the inner diameter of opening 116 is 2.125 inches. In at least one embodiment of the present disclosure, the outer diameter of lip 117 is 2.25 inches. However, opening 116 and lip 117 may be larger than or smaller than these dimensions and still be within the scope of the present disclosure. First end cap 102 further comprises two or more lifting lugs 112, spaced around the circumference of first end cap 102. Underside 105 of first end cap 102 comprises one or more ridges 118 that circumnavigate circular opening 116. In at least one embodiment of the present disclosure, second end cap 104 is identical to first end cap 102.

Figure 14:
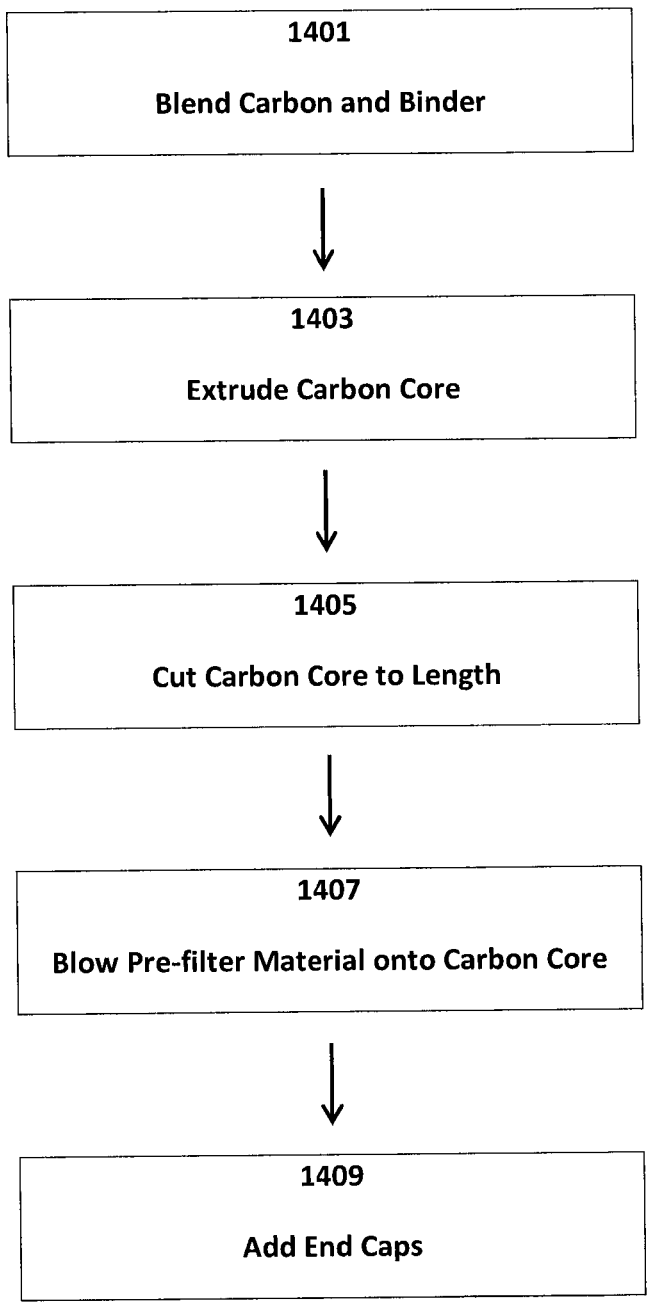
FIG. 14 shows a flow chart illustrating a process for constructing a capped carbon filter assembly according to at least one embodiment of the present disclosure.

FIG. 14 shows a flow chart illustrating a process for constructing capped carbon filter assembly 10, according to at least one embodiment of the present disclosure. In step 1401 of FIG. 14, carbon is mixed with a binder material. In at least one embodiment of the present disclosure, the carbon is a coal-based activated carbon in powder form, granular form, and/or pellet form. The binder material may be, for example, polyester, polypropylene, or nylon. In at least one embodiment of the present disclosure, the carbon and binder material are mixed in a ratio of approximately 80% carbon to approximately 20% binder material. However, the carbon and binder may be mixed in one or more other ratios and still be within the scope of the present disclosure.

In step 1403 of FIG. 14, the carbon/binder mixture is heated past the melting point of the binder material, and then is extruded into the cylindrical shape of carbon core 108 with central cavity 110 that is shown and described elsewhere in the present disclosure.

In step 1405 of FIG. 14, the extruded carbon/binder material is allowed to cool, and then the extruded carbon/binder material is cut into one or more the carbon cores 108, each of a predetermined length. In at least one embodiment of the present disclosure, each carbon core 108 is cut to a length of 24 inches. However, carbon core 108 may be longer than or shorter than 24 inches and still be within the scope of the present disclosure.

In step 1407 of FIG. 14, the pre-filter layer is applied to the exterior surface of the carbon core. The material comprising the pre-filter layer may be polyester, polypropylene, or nylon. In at least one embodiment of the present disclosure, the pre-filter layer material is melt-blown onto the exterior surface of the carbon core until the pre-filter layer is of a predetermined thickness.

In step 1409 of FIG. 14, the end caps, which are constructed of molded polypropylene, are attached to the filter component comprising the carbon core and pre-filter layer. In at least one embodiment of the present disclosure, the end caps are attached to the carbon core by thermally binding the end caps to the carbon core. Each end cap is heated to its surface melting point. Then, the end cap is aligned with the filter material and the lip on the underside of the end cap is inserted into the central cavity of the carbon core. The end cap then is pressed into the carbon core. As the heat from the end cap is transferred to the carbon core, the carbon core binder material softens. Heat and pressure cause the ridges on the underside of the end cap (such as ridges 118 discussed above) to embed into the carbon core. When the end cap and carbon core binder material cool, the end cap is securely attached to the carbon core.

After being presented with the present disclosure, those of skill in the art will realize that a capped carbon filter assembly according to the present disclosure minimizes channeling or bypassing, which is a drawback of prior art filter designs. Further, after being presented with the present disclosure, those of skill in the art will realize that, because a capped carbon filter assembly according to the present disclosure utilizes no metal in its construction, a capped carbon filter assembly according to the present disclosure allows for longer useful filter life when compared to prior art filter designs, and also a capped carbon filter assembly according to the present disclosure may be incinerated after it is removed from service, thereby eliminating the need for disposal in a landfill.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A carbon filter comprising:
   a carbon-based core having a cylindrical shape, a top end, a bottom end, a carbon-based external wall, and a carbon-based internal wall, said carbon-based internal wall defining a central cavity, said central cavity extending from said top end to said bottom end of said carbon-based core;
   a layer of a melt-blown polymer-based filter material applied to said carbon-based external wall, said layer of a melt-blown polymer-based filter material surrounding said carbon-based core; and
   at least one end cap fixedly attached to said carbon-based core.

2. The carbon filter of claim 1, wherein said carbon-based core comprises a mixture of carbon and a binding material.

3. The carbon filter of claim 2, wherein said binding material comprises a polymer.

4. The carbon filter of claim 3, wherein said polymer is selected from the group consisting of polyester, polypropylene, and nylon.

5. The carbon filter of claim 1, wherein said at least one end cap comprises an opening therethrough.

6. The carbon filter of claim 5, wherein said at least one end cap is affixed to said top end of said carbon-based core.

7. The carbon filter of claim 6, wherein said opening in said at least one end cap aligns with said central cavity.

8. The carbon filter of claim 1, wherein said at least one end cap comprises a first end cap and a second end cap.

9. The carbon filter of claim 8, wherein said first end cap is affixed to said top end of said carbon-based core and said second end cap is affixed to said bottom end of said carbon-based core.

10. The carbon filter of claim 9, wherein said first end cap comprises a first end cap opening therethrough, and wherein said first end cap opening aligns with said central cavity.

11. The carbon filter of claim 10, wherein said second end cap comprises a second end cap opening therethrough, and wherein said second end cap opening aligns with said central cavity.

12. The carbon filter of claim 1, wherein said polymer-based filter material comprises a polymer selected from the group consisting of polyester, polypropylene, and nylon.

13. A method for making a carbon filter assembly, the method comprising the steps of:
   mixing carbon and a binder material to make a carbon/binder mixture;
   extruding said carbon/binder mixture to form a filter core, said filter core having a cylindrical shape, a top end, a bottom end, a carbon-based internal wall defining a central cavity, and an external surface;
   applying a layer of melt-blown filter material to said exterior surface of said filter core;
   affixing a first end cap to said top end of said filter core; and
   affixing a second end cap to said bottom end of said filter core.

14. The method of claim 13, wherein the step of mixing carbon a binder material to make a carbon/binder mixture comprise the steps of:
   selecting said binder material from the group consisting of polyester, polypropylene, and nylon;
   mixing said carbon and said binder material to make said carbon/binder mixture, wherein said carbon and said binder material are present in a ratio of about 80% carbon by volume to about 20% binder material by volume; and
   heating said carbon/binder mixture past a melting point of said binder material.

15. The method of claim 13, further comprising the step of:
   cutting said filter core to a predetermined length.

16. The method of claim 13, wherein the step of affixing a first end cap to said top end of said filter core comprises the steps of:
   heating said first end cap;
   aligning said first end cap with said filter core; and
   pressing said first end cap into said filter core.

17. The method of claim 16, wherein the step of affixing a second end cap to said bottom end of said filter core comprises the steps of:
   heating said second end cap;
   aligning said second end cap with said filter core; and
   pressing said second end cap into said filter core.

18. A method for purifying natural gas, the method comprising the steps of:
   exposing natural gas to a solvent selected from the group consisting of amine solvents and glycol solvents; and
   filtering said solvent using a carbon filter, the carbon filter comprising:
      a carbon-based core having a cylindrical shape, a top end, a bottom end, a carbon-based external wall, and a carbon-based internal wall, said carbon-based internal wall defining a central cavity, said central cavity extending from said top end to said bottom end of said carbon-based core;
      a layer of a melt-blown polymer-based filter material applied to said carbon-based external wall, said layer of a melt-blown polymer-based filter material surrounding said carbon-based core; and
      at least one end cap fixedly attached to said carbon-based core.

* * * * *